Figure 1:
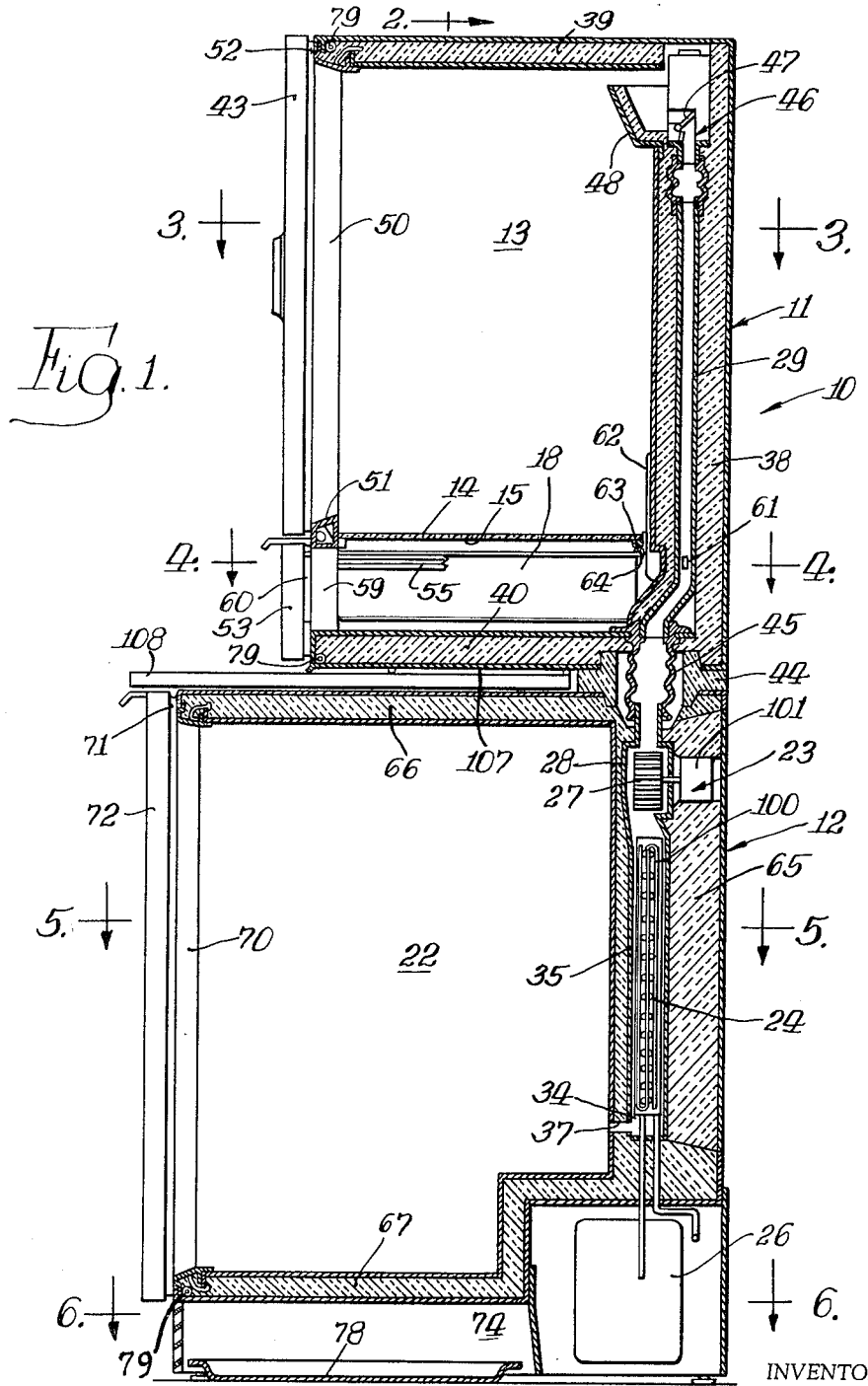

Feb. 1, 1966   R. E. WALLENBROCK ET AL   3,232,071
AIR FLOW CONTROL FOR USE IN REFRIGERATION APPARATUS
Filed Aug. 12, 1963   4 Sheets-Sheet 1

INVENTORS.
Ralph E. Wallenbrock,
BY John Sigl,
Hofgren, Wegner, Allen,
Stellman & McCord Attys.

United States Patent Office 3,232,071
Patented Feb. 1, 1966

3,232,071
AIR FLOW CONTROL FOR USE IN REFRIGERATION APPARATUS
Ralph E. Wallenbrock and John Sigl, Evansville, Ind., assignors to Whirlpool Corporation, a corporation of Delaware
Filed Aug. 12, 1963, Ser. No. 301,394
14 Claims. (Cl. 62—207)

This invention relates to refrigeration apparatus and in particular to means for controlling refrigerated air flow in such apparatus.

In multi-chamber refrigeration apparatuses such as combination refrigerator-freezer chamber apparatuses, substantially frost-free refrigeration of the chamber is effected by circulation of refrigerated air through the chambers by suitable air flow means. It is desirable in such apparatus to utilize a single heat absorbing means, conventionally an evaporator, for cooling the air delivered to each of the chambers. A problem arises, however, in the control of the refrigeration apparatus as different chambers may require cooling at different times. Heretofore, the known means for sensing the refrigeration requirements have not proven completely satisfactory because of the relatively high cost thereof and the failure thereof to sense accurately the need for refrigeration of only one of the plurality of chambers being refrigerated.

The present invention comprehends an improved refrigeration apparatus eliminating the disadvantages of the known apparatuses in a simple manner. Thus, a principal feature of the present invention is the provision of a new and improved refrigeration apparatus.

Another feature of the invention is the provision of such apparatus having new and improved means for controlling the delivery of refrigerated air to chambers to be refrigerated.

A further feature of the invention is the provision of such apparatus wherein the temperatures of the air streams circulated from the several chambers are effectively integrated so as to produce a single control temperature sensed by suitable control apparatus for controlling the refrigeration unit.

Still another feature of the invention is the provision of such apparatus including means defining a first chamber to be refrigerated, means defining a second chamber to be refrigerated, air refrigerating means, air mixing means, first duct means for conducting air streams from the chambers through the refrigerating means to the air moving means for mixing therein, second duct means for conducting mixed refrigerated air from the air mixing means to the chambers, and means for operating the air refrigerating means only when the temperature of the mixed air delivered from the air mixing means is above a preselected temperature.

A further feature of the invention is the provision of such apparatus further including one or more additional chambers to be refrigerated and additional duct means for conducting the refrigerated air to the additional chambers and from the additional chambers through the refrigerating means to the air mixing means.

Another feature of the invention is the provision of such refrigeration apparatus including a main chamber to be refrigerated and a second chamber to be refrigerated having provided therein a pan, and means for selectively cooling the second chamber whereby the pan may comprise a meat pan refrigerated to a relatively low temperature or a crisper refrigerated to a relatively higher temperature.

Still another feature of the invention is the provision of such refrigeration apparatus including new and improved means for maintaining the exterior of the chamber means substantially free of condensation.

Figure 2:
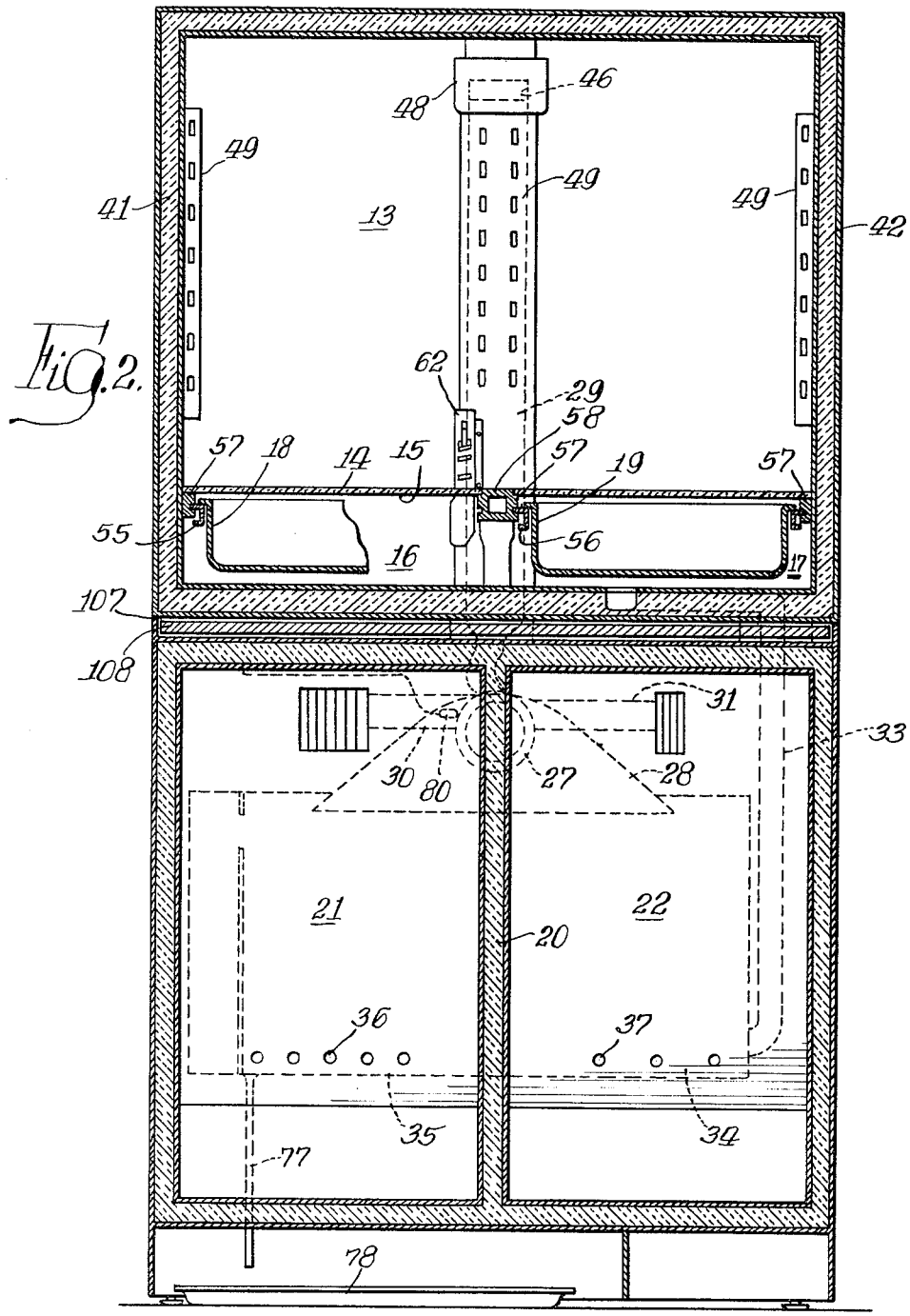
Figure 3:
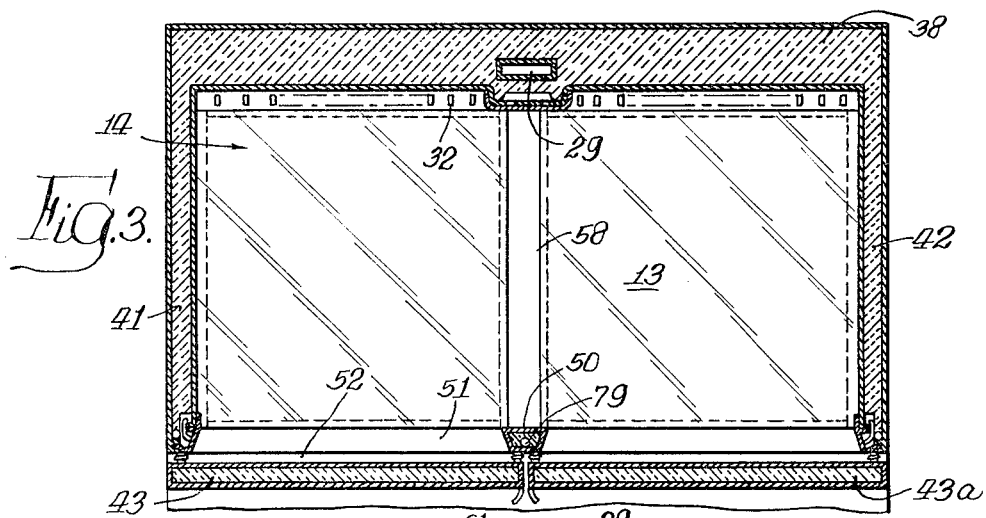
Figure 4:
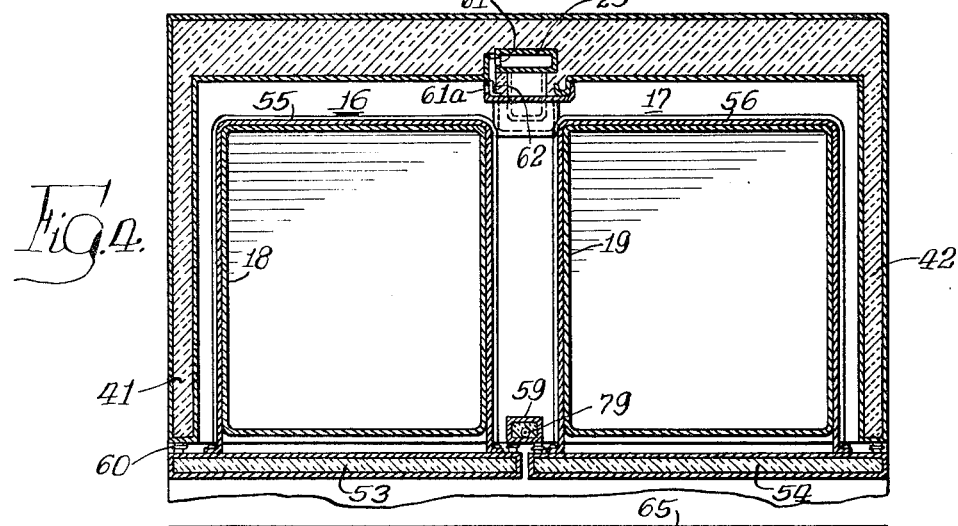
Figure 5:
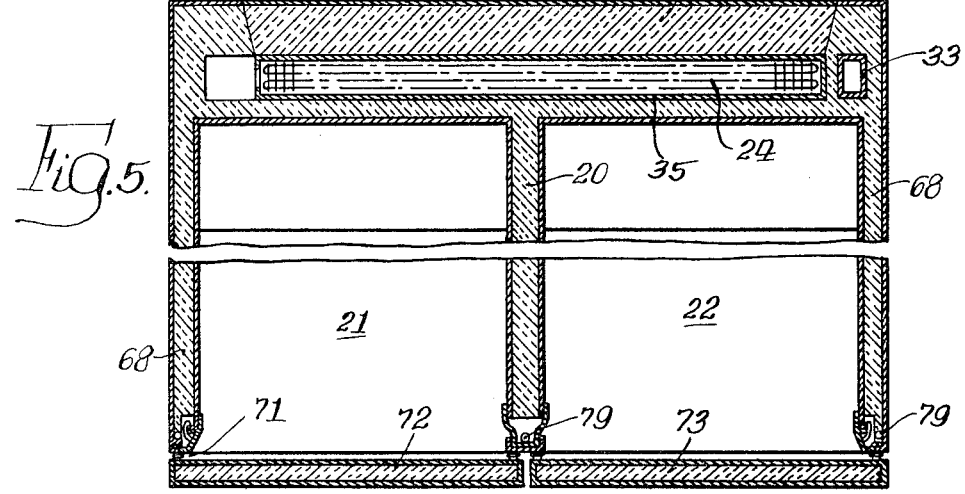
Figure 6:
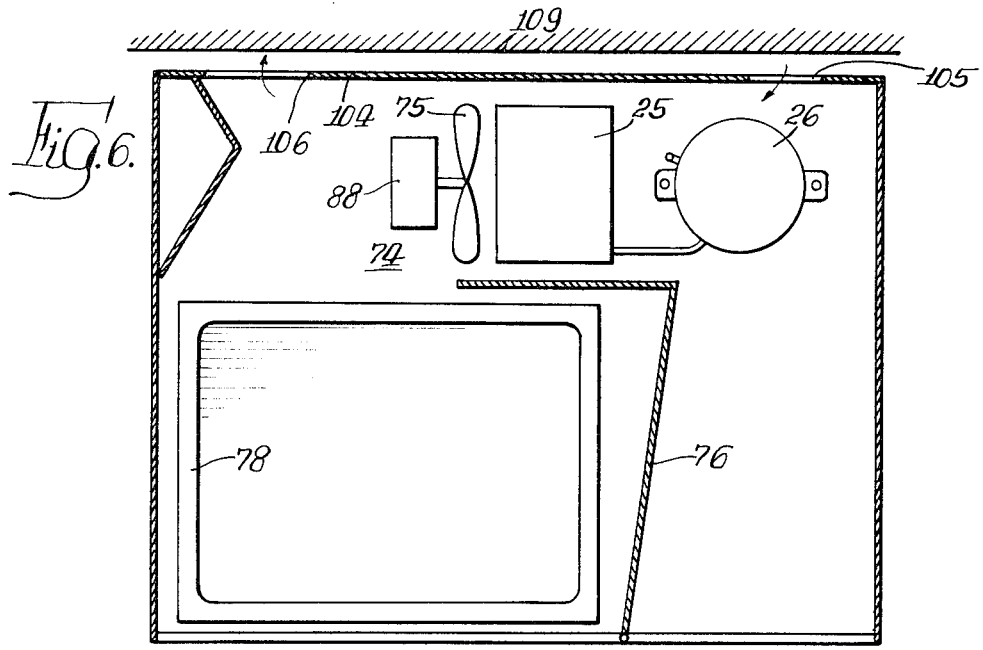
Figure 7:
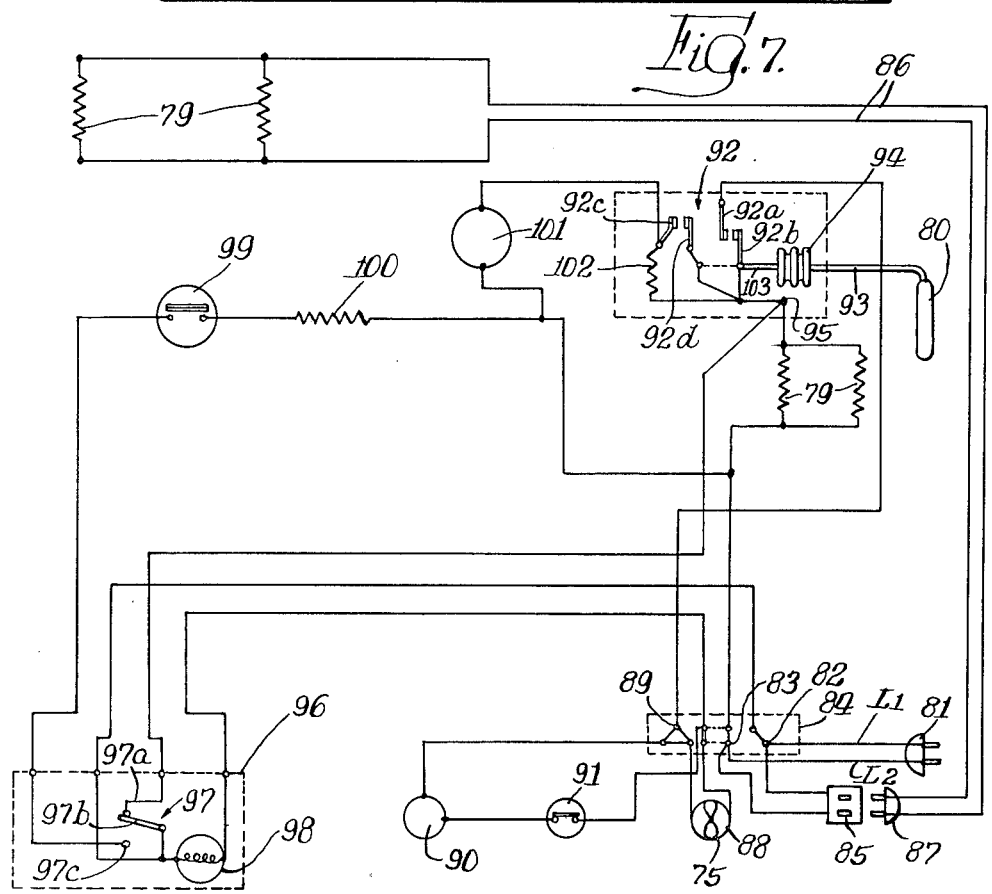

Other features and advantages of the invention will be apparent from the following description taken in connection with the accompanying drawings wherein:

FIGURE 1 is a vertical section of a refrigeration apparatus embodying the invention;
FIGURE 2 is a vertical section thereof taken substantially along the line 2—2 of FIGURE 1;
FIGURE 3 is a horizontal section thereof taken substantially along the line 3—3 of FIGURE 1;
FIGURE 4 is a horizontal section thereof taken substantially along the line 4—4 of FIGURE 1;
FIGURE 5 is a horizontal section thereof taken substantially along the line 5—5 of FIGURE 1;
FIGURE 6 is a horizontal section thereof taken substantially along the line 6—6 of FIGURE 1; and
FIGURE 7 is a schematic wiring diagram of the electrical circuitry of the refrigeration apparatus.

In the exemplary embodiment of the invention as disclosed in the drawing, a refrigeration apparatus generally designated 10 is shown to comprise an upper cabinet 11 and a lower cabinet 12. The upper cabinet defines a refrigerator chamber 13. A horizontal wall 14 extends across the refrigerator chamber 13 to define a lower chamber 15 effectively defining a lefthand chamber portion 16 and a righthand chamber portion 17 in which are disposed pans 18 and 19, respectively. The lower cabinet is divided by an upright central insulated wall 20 to define a lefthand freezer chamber 21 and a righthand refrigerator chamber 22.

The respective chambers 13, 16, 17, 21 and 22 are cooled by means of refrigerated air circulated therethrough by a refrigerating means generally designated 23 carried in the lower cabinet 12 rearwardly of the chambers 21 and 22. More specifically, the refrigerating means includes an evaporator 24 to which refrigerant is conducted from a condenser 25 (see FIGURE 6) and a compressor 26 arranged in conventional manner. Air is circulated through the evaporator by means of a blower 27 disposed within a plenum 28. The refrigerated air is effectively mixed by the blower 27 and delivered therefrom through a first duct 29 to the refrigerator chamber 13, a second duct 30 to the freezer chamber 21, and a third duct 31 to the refrigerator chamber 22. The refrigerated air delivered to chamber 13 passes downwardly therefrom through suitable openings 32 in the rear of dividing wall 14 to the chamber portions 16 and 17 of compartment 15. The air flows from compartment 15 through a duct 33 to a bottom portion 34 of the housing 35 of evaporator 24. The refrigerated air delivered to chamber 21 is circulated back to the bottom portion 34 of the evaporator housing through suitable openings 36 at the rear thereof and refrigerated air delivered to refrigerator chamber 22 is circulated back to the evaporator bottom portion 34 through suitable openings 37 at the rear thereof. Thus, blower 27 circulates refrigerated air through each of the respective chambers of the refrigeration apparatus and the evaporator 24 provides a frost-free refrigeration thereof.

Temperature differentials between the different chambers are obtained by controlling the quantity of the refrigerated air delivered to the respective chambers so that the freezer chamber 21 is maintained at the desired subfreezing temperature, e.g., 0 to 10° F., while the temperature of refrigerator chambers 13 and 22 may be maintained at a temperature slightly above freezing, e.g., approximately 34 to 36° F. Still further, the temperature of the chamber portions 16 and 17 of the compartment 15 may be maintained at a slightly higher value such as approximately 40° F. although, as will be brought out subsequently, the chamber portion 16 may be maintained at a lower temperature where it is desired to utilize pan 18 as a meat pan.

More specifically, cabinet 11 includes an insulated rear wall 38, top wall 39, bottom wall 40, side walls 41 and 42, and a pair of movable front doors 43 and 43a for providing controlled access to the chamber 13 defined by the insulated walls. As shown in FIGURE 1, an insulated connector 44 is located between cabinets 11 and 13 for insulating duct 45. Duct 45 connects air plenum 28 to the duct 29 carried in the insulated rear wall 38 of the upper cabinet 11 for delivery of refrigerated air to chamber 13 from blower 27. At its upper end, the duct 29 is provided with an inlet 46 to the chamber 13 including a damper 47 and an air deflecting baffle 48 for controlling the delivery of the refrigerated air into the chamber 13. The rear wall 38 of the cabinet 11 may be provided with suitably slotted supports 49 for cooperation with suitable shelves (not shown) to hold the shelves at different preselected levels across chamber 13.

The doors 43 and 43a may be sealingly closed with the top wall 39, side walls 41 and 42, an upright mullion 50, and a horizontal transverse mullion 51 at the front of the glass or plastic wall 14, by means of a magnetic gasket 52. The compartment 15 is closed by a pair of drawers 53 and 54 below doors 43 and 43a. As shown in FIGURE 4, the drawer 53 is provided with a bracket 55 embracing the meat pan 18, and drawer 54 is provided with a bracket 56 embracing the crisper pan 19. As shown in FIGURE 2, the brackets 55 and 56 are slidably carried on tracks 57 on the side walls 41 and 42 of the cabinet 11 and on a center fore-and-aft mullion 58 in the center of the plastic or glass wall 14, so that movement of the drawers 53 and 54 outwardly away from and inwardly toward the compartment 15 permits selective withdrawal and insertion of the pans 18 and 19 as desired. Also, pans 18 and 19 may be selectively removed from brackets 55 and 56 for use outside of the refrigeration apparatus. However, drawers 53 and 54 can be closed since the drawers 53 and 54 and brackets 55 and 56 are independent of pans 18 and 19. As shown in FIGURES 1, 3 and 4, the drawers 53 and 54 are sealingly closed with the side walls 41 and 42, the horizontal mullion 51, the bottom wall 40, and the lower end 59 of the upright mullion 50 at the front of the fore-and-aft mullion 58 by means of a suitable magnetic gasket 60.

As indicated briefly above, the pan 18 may be used as a meat pan with the temperature therein being maintained somewhat lower than in the crisper pan 19. For this purpose, an outlet 61 is provided in the duct 29 leading therefrom to a metered outlet 61a. A manually operable damper 62 is provided for controlling the outlet 61a. A ledge 63 is provided on the rear wall 38 for sealing the glass wall 14 to an upper rear flange portion 64 of the meat pan 18, as shown in FIGURE 1. The cold air entering chamber portion 16 from duct 29 cools chamber portion 16 to somewhat below the temperature of the chamber portion 17, whereby the pan 18 may be used as a meat pan and the pan 19 may be used as a crisper pan. A manual damper control 62 is arranged to permit a complete closing of the outlet 61 to preclude delivery of any air directly from the duct 29 to the chamber portion 16, when desired, so that both chamber portions 16 and 17 may, with the damper so arranged, comprise crisper pan portions of the refrigeration apparatus.

Illustratively, the damper 62 may be adjusted to a maximum open arrangement wherein the temperature in the chamber portion 16 may be approximately 30° F. Alternatively, the damper may be arranged to close the outlet 61 to provide a temperature in each of the chamber portions 16 and 17 of approximately 37° F. and thus the pan 18 may be selectively a meat pan or a crisper pan as desired.

The lower cabinet 12 includes a rear wall 65 comprising a removable insulated access panel. The cabinet 12 further includes insulated top wall 66, bottom wall 67, side walls 68, and the center dividing wall 20. An upright center mullion 70 extends along the front edge of the center wall 20 and a magnetic gasket 71 is provided for use in sealing a pair of chamber-closing doors 72 and 73 to the side walls, top wall, bottom wall, and center mullion of the lower cabinet.

As shown in FIGURES 1 and 2, cabinet 12 further defines a lowermost apparatus space 74 below bottom wall 67 in which the compressor 26, condenser 25 and a fan 75 are mounted. As shown in FIGURE 6, the space 74 is divided by a dividing wall 76 for directing air flow therethrough for efficient cooling of the compressor 26 and transfer of heat from the refrigerant in condenser 25. As shown in FIGURE 2, a drain conduit 77 is provided leading from the evaporator housing 35 downwardly into space 74 over a melt collecting pan 78 therein. The relatively warm air circulated by fan 75 picks up the moisture from the pan 78 and dissipates it into the atmosphere.

To preclude the sweating of the cabinet surfaces outwardly adjacent the gaskets 52, 60 and 71, heaters 79 are provided for warming the cabinet portion adjacent the gaskets.

As shown in FIGURE 2, a sensing bulb 80 is disposed in duct 30 downstream of blower 27 for sensing the temperature of the refrigerated air directly after it is mixed by the blower 27 for delivery to the different chambers of the refrigeration apparatus.

Referring now to FIGURE 7, the operation of refrigeration apparatus 10 will be described in conjunction with the wiring diagram illustrated therein. Electrical power is supplied to the refrigeration apparatus through a pair of incoming supply leads $L_1$ and $L_2$ arranged to be connected to a conventional power supply (not shown) as by a conventional plug 81. Leads $L_1$ and $L_2$ are connected, respectively, to terminals 82 and 83 of a junction box 84 carried in the lower cabinet 12. A female plug 85 is connected to the terminals 82 and 83 and the heaters 79 of the upper cabinet are connected to the plug 85 by suitable interconnecting wires 86 and plug 87. The fan 75 is driven by an electric motor 88 which is connected between terminal 83 and a terminal 89 of junction box 84. The compressor 26 is driven by a motor 90 which is connected to terminal 89 and through a bi-metallic overload device 91 to the terminal 83. Terminal 89 is connected to a fixed contact 92a of a double pole single throw switch 92. The sensing bulb 80 is connected through a suitable conduit 93 to a bellows 94 for actuating the moving contact 92b associated with fixed contact 92a. Thus, when the bellows 94 expands and closes the contact 92b with the contact 92a, a circuit is established from terminal 89 of junction box 84 to a terminal 95 to which moving contact 92b is connected.

A circuit is completed back from terminal 95 to terminal 82 of junction box 84 through a defrost timer 96 including a timer switch 97 having a fixed contact 97a connected to the terminal 95 and a moving contact 97b connected to the terminal 82 of the junction box 84. A motor 98 of the timer 95 is connected from terminal 83 to terminal 82 of the junction box 84 and is thus energized at all times when the plug 81 is connected to the power supply. The timer operates so that after a preselected time the switch 97 is operated to throw the moving contact 97b from its engagement with fixed contact 97a to a fixed contact 97c which is connected through a normally closed, bimetallic defrost termination sensor 99 and a defrost heater 100 to terminal 83, thereby completing a circuit from terminal 82 through the switch 97 to the defrost heater.

Blower 27 is driven by a motor 101 carried in the access panel 65, the motor being connected from terminal 83 of junction box 84 to a second fixed contact 92c of switch 92. The fixed contact 92c is in turn connected through a resistor 102 to terminal 95. Switch 92 further includes a moving contact 92d which is operated conjointly with moving contact 92b by an actuator 103 extending from the bellows 94. Moving contact 92d is connected to the terminal 95 and thus when the moving contact 92d is closed with fixed contact 92c the resistor 102 is shorted out. Thus, assuming that the temperature sensed by the bulb 80 is relatively low, the bellows 94 will have retracted so as to space the moving contacts 92b and 92d from the fixed contacts 92a and 92c of switch 92. Thus, the blower motor 101 is energized at a reduced voltage and runs at a low rate of speed resulting from the connection thereof through the resistor 102, terminal 95, and switch 97 to the terminal 82 of the junction box 84. The heaters 79 of the lower cabinet are energized from terminal 83 to terminal 95 and thence through switch 97 to terminal 82 when switch 97 is in the position shown in FIGURE 7.

When the temperature sensed by bulb 80 rises sufficiently to cause bellows 94 acting through actuator 103 to close moving contact 92b with fixed contact 92a and moving contact 92d with fixed contact 92c of switch 92, the resistor 102 is shorted out and the blower 101 operates at high speed. Concurrently, the condenser fan motor 88 and the compressor motor 90 are energized through fixed contact 92 and moving contact 92b, terminal 95, fixed contact 97a and moving contact 97b of switch 97 to terminal 82 of junction box 84. Thus, the compressor is operated to effect a delivery of refrigerant to the evaporator 24 whereby the air circulated by blower 27 to the evaporator through duct 33 and openings 36 and 37 is refrigerated in passing through the evaporator.

As the sensing bulb 80 is disposed downstream of the blower 27, the cooling of the different streams of air circulated through the evaporator 24 need not be to uniformly equal temperatures as the mixing of the different air streams in the blower 27 provides an effective integration of the different temperatures resulting in a single temperature delivery of refrigerated air from the blower. It is this single temperature, mixed air delivery which is sensed by the bulb 80. Thus, for example, should the user open the door 43, raising the temperature within chamber 13 somewhat, the temperature of the air circulated back to the evaporator through duct 33 will be somewhat higher than prior to the opening of the door. This somewhat higher temperature air is mixed with the still low temperature air being circulated from the other chambers of the refrigeration apparatus by the blower 27 before being sensed by bulb 80 and returned to the different chambers of the apparatus including the chamber 13. As long as the resultant temperature of this mixture delivered from the blower 27 remains below the preselected temperature at which the bellows 94 actuates the switch 92, the compressor is not operated. When, however, sufficient heat is introduced into the circulated air as by opening one or more doors of the refrigeration apparatus for a sufficient period of time or as by normal heat loss through the insulated walls, the integrated temperature sensed by the bulb 80 is sufficiently high to actuate the bellows 94 and thereby throw the switch 92 to effect the above described operation of the compressor motor 90, thereby initiating a refrigeration cycle.

As indicated briefly above, the different air streams passing through the evaporator 24 during the refrigeration cycle may actually be cooled to slightly different temperatures. However, here again the blower 27 acts to mix the different air streams and produce an effectively integrated single temperature air supply for delivery to the respective chambers of the refrigeration apparatus. Thus, when the temperature of the mixed air delivery reaches the preselected low temperature at which the bellows 94 operates to open the switch 92, the operation of the refrigeration unit is discontinued and the blower motor again is caused to operate at low speed, circulating the cooled air through the various chambers without refrigeration flow through the evaporator 24.

As shown, the defrost timer 96 is arranged to prevent operation of the blower motor 101, the compressor motor 90, and the condenser fan motor 88 during the defrost cycle.

As indicated briefly above, the condenser fan circulates air through the space 74 to cool the compressor 26 and remove heat from the refrigerant in the condenser 25. In addition to serving as a means for dissipating the collected melt in pan 78, the heated air is caused to serve as means for maintaining the outer surfaces of the cabinets substantially free of condensation. More specifically, as seen in FIGURE 6, the rear of space 74 is defined by a wall member 104 having an air inlet opening 105 and an air outlet opening 106. The fan 75 causes air to be sucked in through opening 105 and blown out through outlet 106, as shown by the arrows. At best seen in FIGURES 1 and 2, the lower wall 40 of upper cabinet 11 and the upper wall 65 of lower cabinet 12 are spaced apart vertically to define a passage 107 therebetween leading from the rear of the refrigeration apparatus to the front thereof below drawers 53 and 54 of the upper cabinet. A portion of this space is occupied by a wooden cutting board 108 which may be moved forwardly from and rearwardly into the space 107 as desired. There remains sufficient air flow passage around the cutting board 108, however, to permit the air delivered outwardly from outlet 106 upwardly along the wall 109, such as the building wall against which the refrigeration apparatus is backed, to pass through the passage 107 and prevent condensation therein. In addition, this relatively warm air flows upwardly along the vertical wall members of the refrigeration apparatus further preventing condensation on these surfaces.

Thus, refrigeration apparatus embodying this invention provides a plurality of chambers which may be selectively controlled to have different temperatures therein. Frostfree refrigeration of the chambers is effected by means of a single evaporator and a single blower for circulating the refrigerated air to the respective chambers. The control is arranged in a novel and simple manner to provide accurate sensing of the integrated air temperature, thereby effectively minimizing the on-and-off cycling of the refrigeration unit and effectively assuring that each of the chambers is refrigerated to the preselected desired temperature at all times. The refrigeration apparatus is extremely flexible in the possible arrangements and combinations of the cabinet structures and chambers provided therein. The apparatus is further arranged to effectively eliminate condensation from the exterior surfaces of the cabinets.

While we have shown and described one embodiment of the invention it is to be understood that it is capable of many modifications. Changes, therefore, in the construction and arrangement may be made without departing from the spirit and scope of the invention as defined in the appended claims.

The embodiment of the invention in which an exclusive property or privilege is claimed is defined as follows:

1. Refrigeration apparatus comprising: means defining a first chamber to be refrigerated; means defining a second chamber to be refrigerated; air refrigeration means; air mixing means; first duct means for conducting air streams from said chambers through said refrigerating means to said air mixing means for mixing therein; second duct means for conducting mixed air from said air mixing means to said chambers; and means for operating said air mixing means for substantially continuously mixing air from said chambers and for operating said air refrigerating means only when the temperature of mixed air being delivered from said air mixing means is above a preselected temperature.

2. The refrigeration apparatus of claim 1 wherein said means for operating said air refrigerating means includes a sensing element.

3. The refrigeration apparatus of claim 1 including means for selectively controlling the speed of said air mixing means.

4. Refrigeration apparatus comprising: means defining a first chamber to be refrigerated; means defining a second chamber to be refrigerated; air refrigerating means;

air mixing means including means for forcibly moving the mixed air; first duct means for conducting air streams from said chambers through said refrigerating means to said air mixing means for mixing therein; second duct means for conducting mixed air from said air mixing means to said chambers; and means for operating said air mixing means for substantially continuously mixing air from said chambers and for operating said air refrigerating means only when the temperature of mixed air being delivered from said air mixing means is above a preselected temperature.

5. The refrigeration apparatus of claim 4 wherein said chambers are arranged to be refrigerated to different pre-selected temperatures by the refrigerated air delivered thereto from said second duct means.

6. The refrigeration apparatus of claim 4 wherein said air mixing means comprises a blower.

7. Refrigeration apparatus comprising: means defining a first chamber to be refrigerated; means defining a second chamber to be refrigerated; air refrigerating means; air mixing means comprising air moving means; first duct means for conducting air streams from said chambers through said refrigerating means to said air mixing means for mixing therein; second duct means for conducting mixed air from said air mixing means to said chambers; means for operating said air mixing means for substantially continuously mixing air from said chambers and for operating said air refrigerating means only when the temperature of mixed air being delivered from said air mixing means is above a preselected temperature; and means for selectively adjusting the rate of refrigerated air flow from said second duct means to the respective chambers.

8. Refrigeration apparatus comprising: means defining a first chamber to be refrigerated; means defining a second chamber to be refrigerated; means defining a third chamber to be refrigerated; air refrigerating means; air mixing means comprising air moving means; first duct means for conducting air streams from at least two of said chambers through said refrigerating means to said air mixing means for mixing therein; second duct means for conducting mixed air from said air mixing means to said first and third chambers; means providing communication between said first and second chambers; and means for operating said air mixing means for substantially continuously mixing air from said chambers and for operating said air refrigerating means only when the temperature of mixed air being delivered from said air mixing means is above a preselected temperature.

9. Refrigeration apparatus comprising: means defining a first chamber to be refrigerated; means defining a second chamber to be refrigerated; means defining a third chamber to be refrigerated; air refrigerating means; air mixing means comprising air moving means; first duct means for conducting air streams from at least two of said chambers through said refrigerating means to said air mixing means for mixing therein; second duct means for conducting mixed air from said air mixing means to said first and third chambers; means providing communication between said first and second chambers; means providing direct communication between said second duct means and said second chamber; and means for operating said air mixing means for substantially continuously mixing air from said chambers and for operating said air refrigerating means only when the temperature of mixed air being delivered from said air mixing means is above a preselected temperature.

10. Refrigeration apparatus comprising: means defining a first chamber to be refrigerated; means defining a second chamber to be refrigerated; means defining a third chamber to be refrigerated; means defining a fourth chamber to be refrigerated; air refrigerating means; air mixing means and moving means; first duct means for conducting air from said third and fourth chambers through said refrigerating means to said air mixing and moving means for mixing therein; second duct means for conducting mixed air from said air mixing and moving means to said first and fourth chambers; means providing communication between said first and second chambers; means providing communication between said second and third chambers; and means for operating said air mixing means for substantially continuously mixing air from said chambers and for operating said air refrigeration means only when the temperature of mixed air being delivered from said air mixing and moving means is above a preselected temperature.

11. Refrigeration apparatus comprising: means defining a first chamber to be refrigerated; means defining a second chamber to be refrigerated; means defining a third chamber to be refrigerated; means defining a fourth chamber to be refrigerated; air refrigerating means; air mixing and moving means; first duct means for conducting air from said third and fourth chambers through said refrigerating means to said air mixing and moving means for mixing therein; second duct means for conducting mixed air from said air mixing and moving means to said first and fourth chambers; means providing communication between said first and second chambers; adjustable means providing direct metered communication between said second duct and said second chamber; means providing communication between said second and third chambers; and means for operating said air mixing means for substantially continuously mixing air from said chambers and for operating said air refrigeration means only when the temperature of mixed air being delivered from said air mixing and moving means is above a preselected temperature.

12. Refrigeration apparatus comprising: means defining a first refrigerator chamber to be refrigerated; means defining a second meat storage chamber to be refrigerated; means defining a third crisper chamber to be refrigerated; means defining a fourth freezer chamber to be refrigerated; means defining a fifth refrigerator chamber to be refrigerated; air refrigerating means; air mixing means comprising air moving means; first duct means for conducting air from said third, fourth and fifth chambers through said refrigerating means to said air mixing means for mixing therein; second duct means for conducting mixed air from said air mixing means to said first, fourth and fifth chambers; means providing communication between said first and second chambers; means providing communication between said second and third chambers; and means for operating said air mixing means for substantially continuously mixing air from said chambers and for operating said air refrigerating means only when the temperature of mixed air being delivered from said air mixing means is above a preselected temperature.

13. Refrigeration apparatus comprising: means defining a first chamber to be refrigerated; means defining a second chamber to be refrigerated; air refrigerating means; air mixing means; first duct means for conducting air streams from said chambers through said refrigerating means to said air mixing means for mixing therein; second duct means for conducting mixed air from said air mixing means to said chambers; means for operating said air mixing means for substantially continuously mixing air from said chambers and for operating said air refrigerating means only when the temperature of the mixed air delivered from said air mixing means is above a preselected temperature; and means for providing waste heat from said air refrigerating means against the exterior of said first and second chamber means for maintaining the same substantially free of condensation.

14. Refrigeration apparatus comprising: means defining a first chamber to be refrigerated; means defining a second chamber to be refrigerated, said first chamber means having an outer surface portion, said second chamber means having an outer surface portion spaced adjacent said outer surface portion of said first chamber means to define a passage open to atmosphere at one end thereof; means for refrigerating air and delivering the refrigerated air to said chambers including duct means extending between said chambers for conducting refrigerated air therebetween; and means for facilitating flow through said passage of relatively warm air including air warmed by waste heat from said air refrigerating means for maintaining said spaced adjacent surface portions substantially free of condensation.

References Cited by the Examiner

UNITED STATES PATENTS

| | | | |
|---|---|---|---|
| 2,128,090 | 8/1938 | Hinze | 62—183 X |
| 2,350,249 | 5/1944 | Osborn | 62—180 X |
| 2,375,851 | 5/1945 | Kalischer | 62—277 X |
| 2,382,084 | 8/1945 | Mathews | 62—419 X |
| 2,458,560 | 1/1949 | Buchanan | 62—207 |
| 2,609,671 | 9/1952 | Gleason | 62—207 |
| 2,702,459 | 2/1955 | Thompson | 62—456 X |
| 2,936,594 | 5/1960 | Jacobs | 62—207 X |
| 3,043,114 | 7/1962 | O'Connell | 62—419 |
| 3,050,956 | 8/1962 | Mann et al. | 62—283 |
| 3,070,973 | 1/1963 | O'Connell | 62—419 X |
| 3,104,533 | 9/1963 | O'Connell | 62—419 |
| 3,107,502 | 10/1963 | Herndon et al. | 62—419 |
| 3,110,158 | 11/1963 | Kuhn et al. | 62—419 X |
| 3,112,619 | 12/1963 | Gelbard | 62—419 |

ROBERT A. O'LEARY, *Primary Examiner.*